Figure 9:
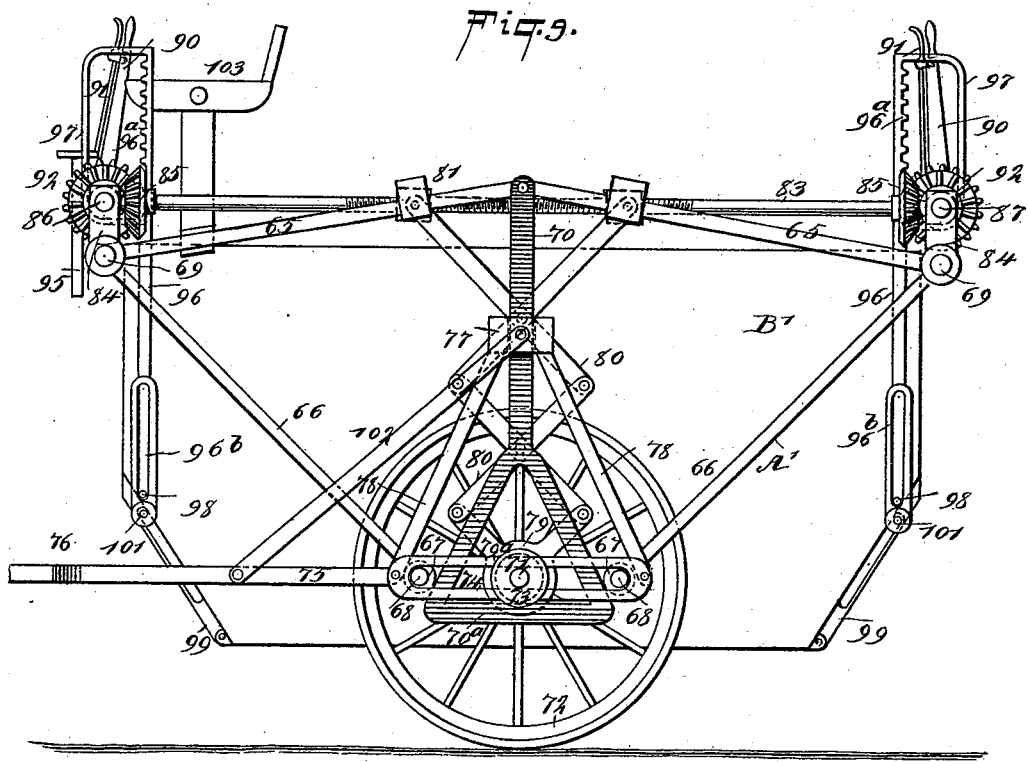

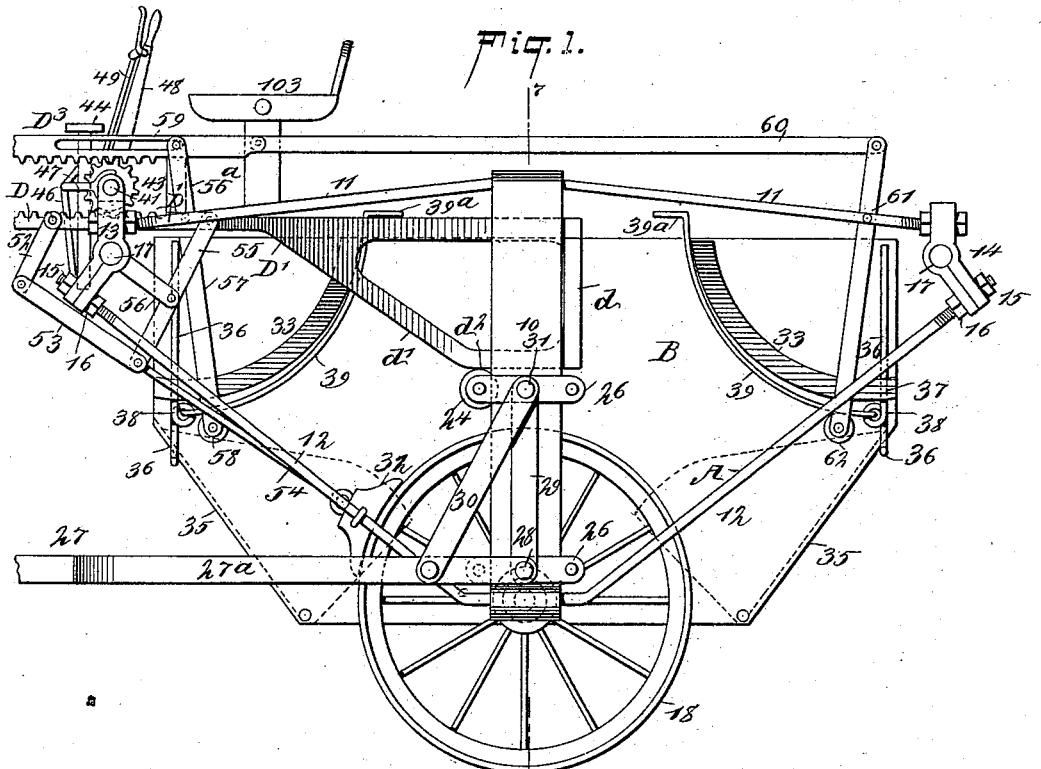

(No Model.) 7 Sheets—Sheet 2.
G. F. FISCHER.
SELF LOADING CART.
No. 528,424. Patented Oct. 30, 1894.
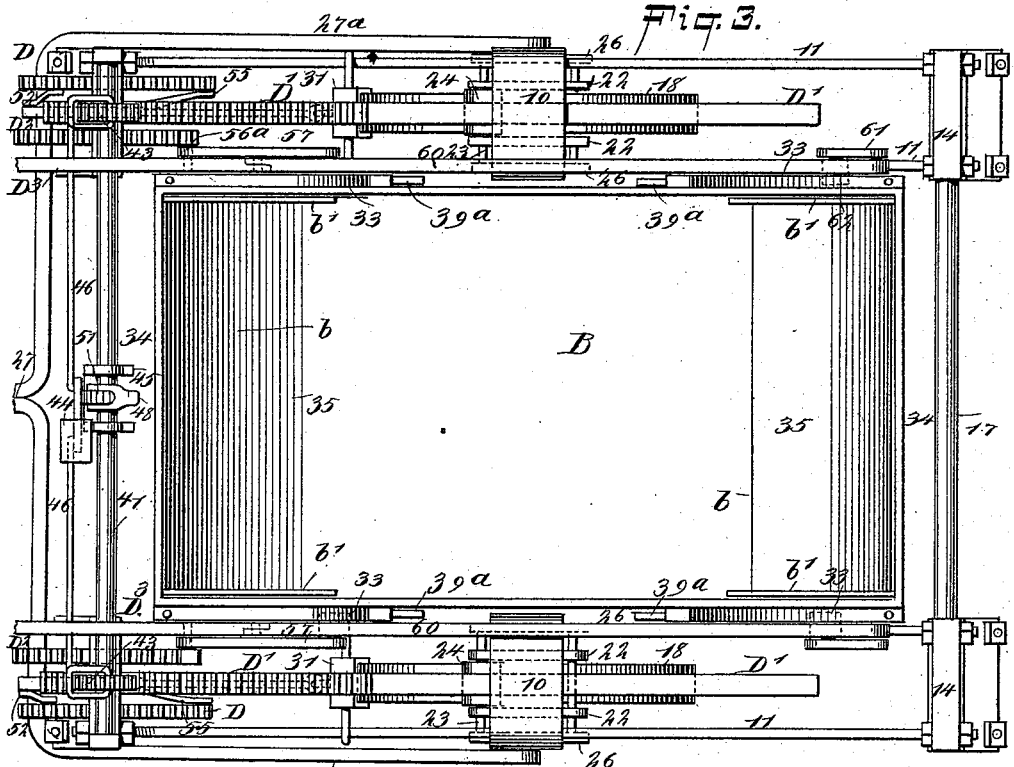
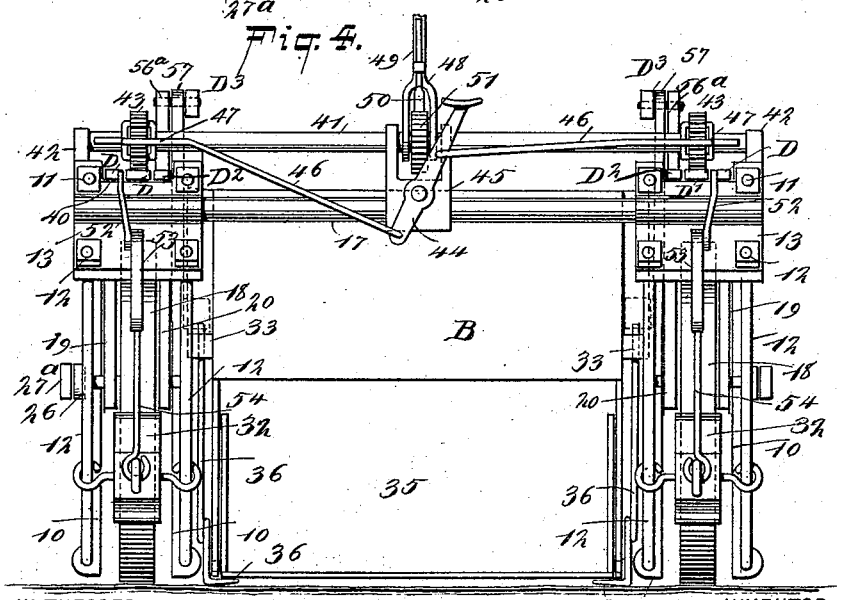
WITNESSES:
William Goebel
E. M. Clark
INVENTOR
G. F. Fischer
BY Munn & Co
ATTORNEYS.

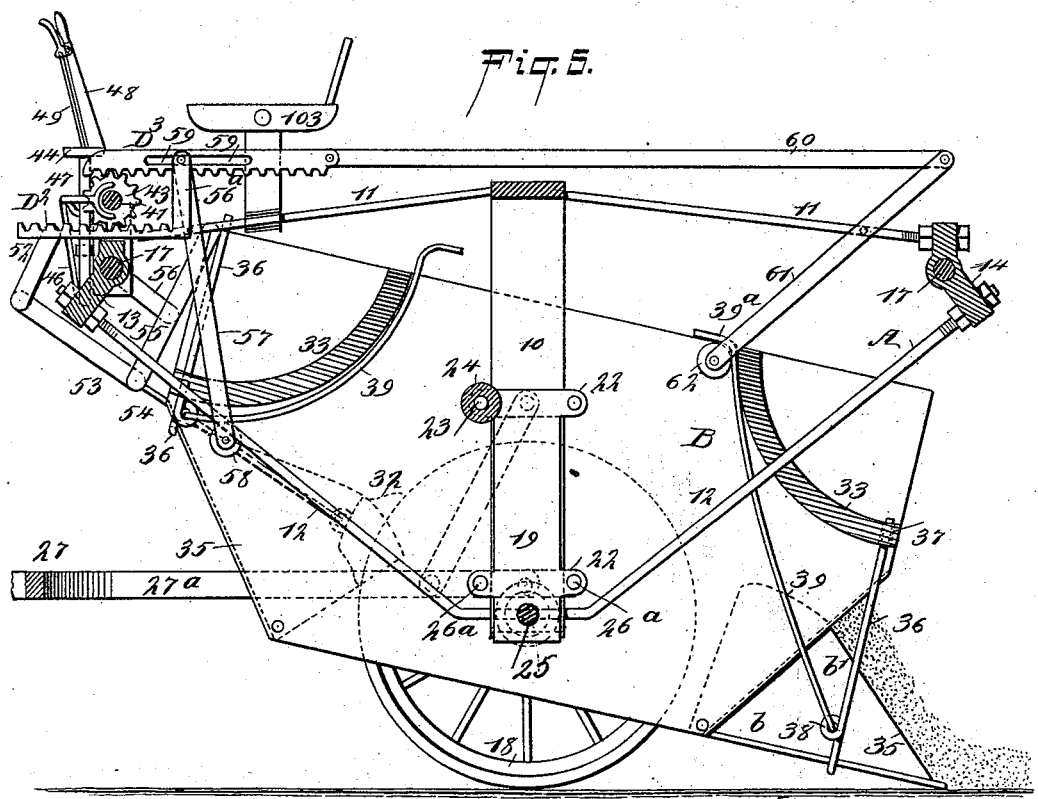
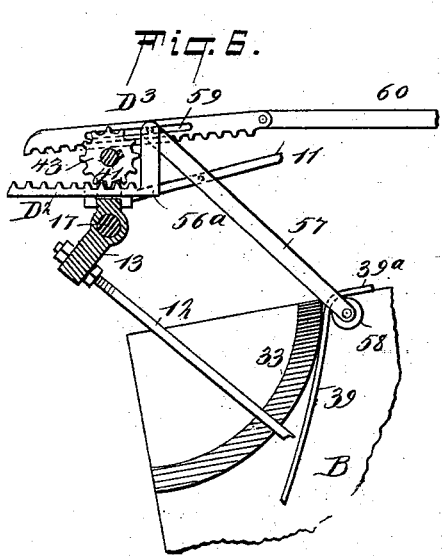
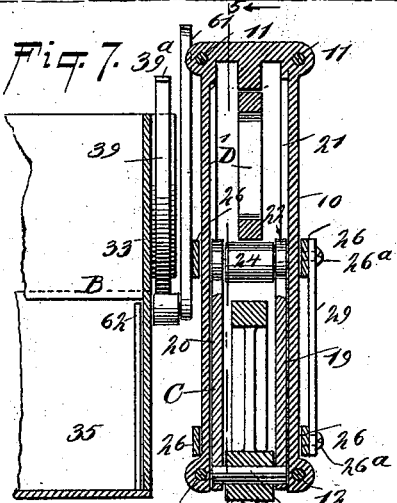
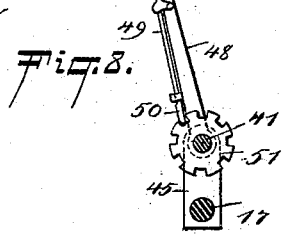

(No Model.) 7 Sheets—Sheet 4.

G. F. FISCHER.
SELF LOADING CART.

No. 528,424. Patented Oct. 30, 1894.

WITNESSES:
William Goebel
E. M. Clark

INVENTOR
G. F. Fischer
BY Munn & Co.
ATTORNEYS.

(No Model.) 7 Sheets—Sheet 5.
G. F. FISCHER.
SELF LOADING CART.
No. 528,424. Patented Oct. 30, 1894.
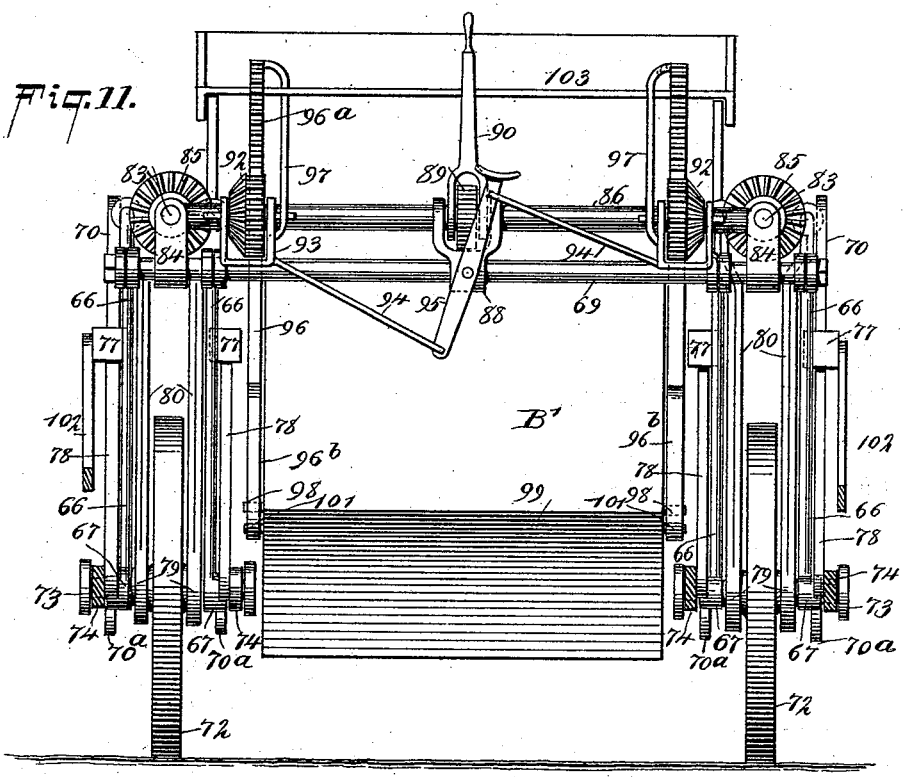
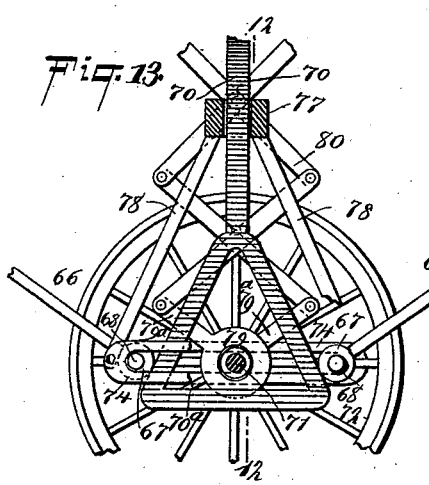
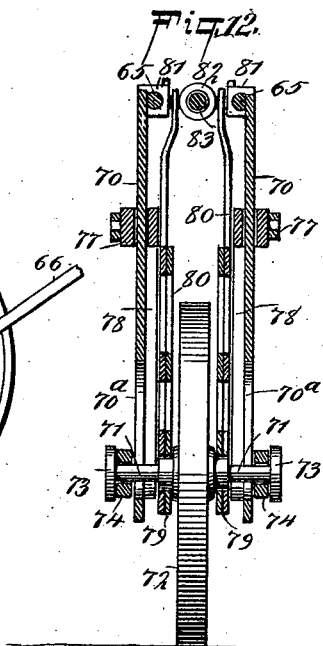
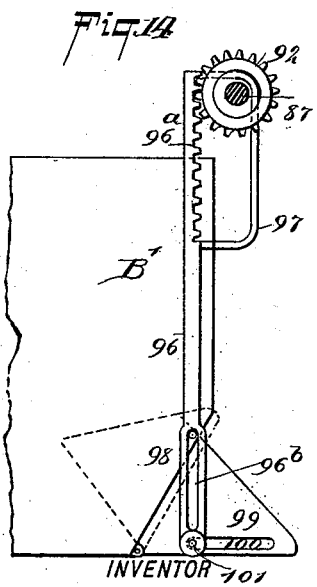
WITNESSES:
William Goebel
E. M. Clark
INVENTOR
G. F. Fischer
BY Munn & Co.
ATTORNEYS.

(No Model.) 7 Sheets—Sheet 6.
G. F. FISCHER.
SELF LOADING CART.
No. 528,424. Patented Oct. 30, 1894.
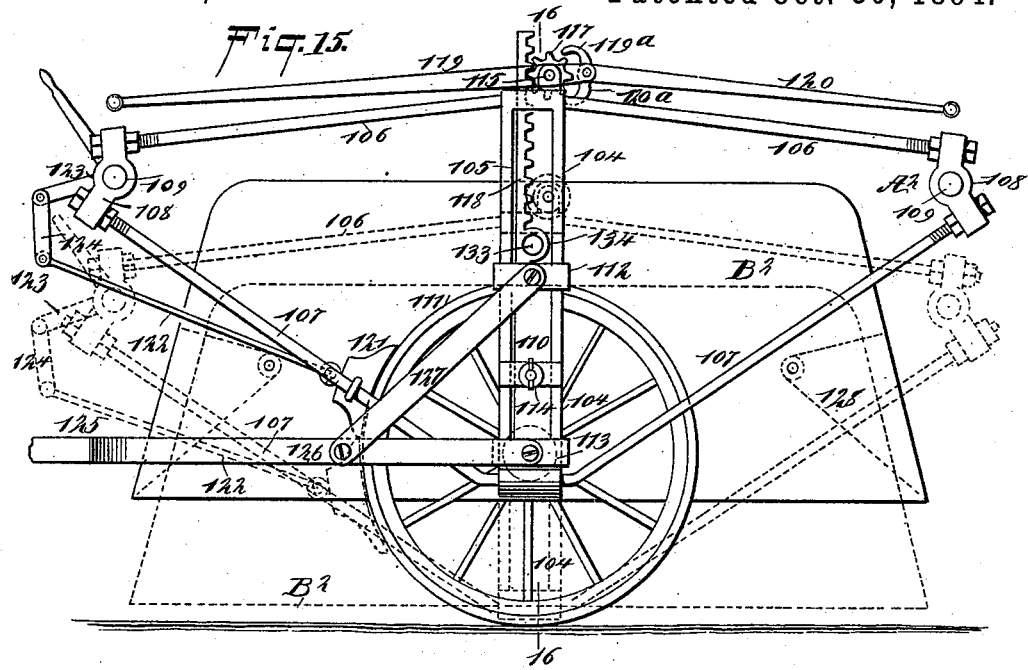
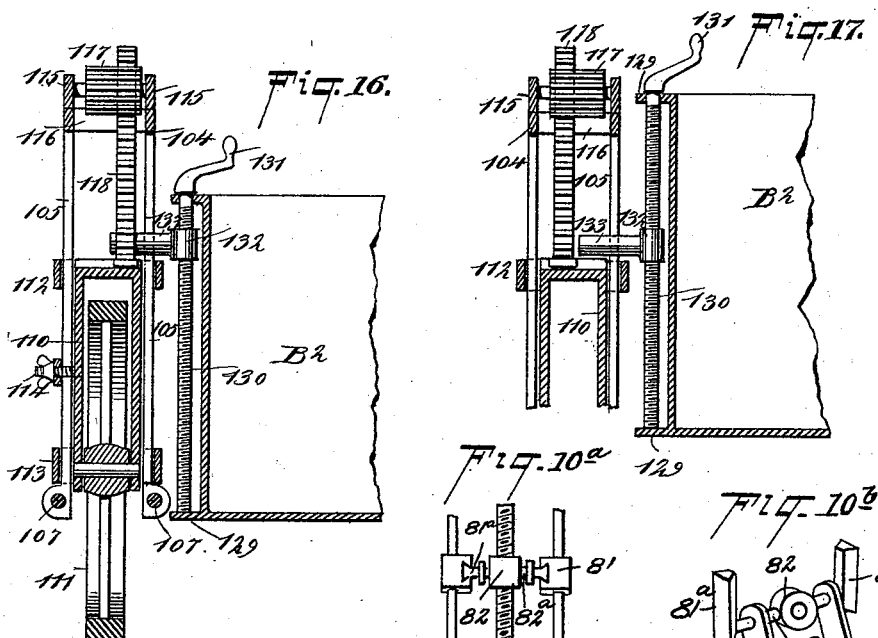
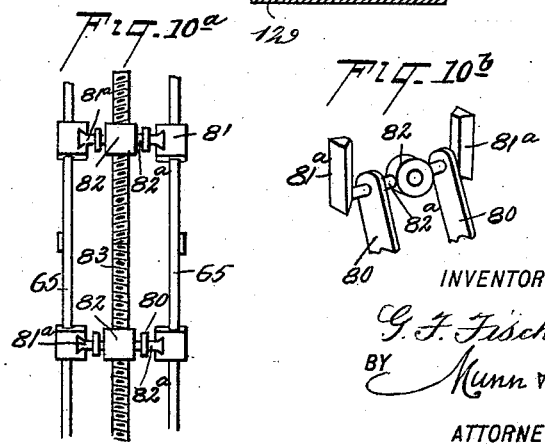
WITNESSES:
William Goebel
E. M. Clark
INVENTOR
G. F. Fischer
BY Munn & Co
ATTORNEYS.

(No Model.) 7 Sheets—Sheet 7.
G. F. FISCHER.
SELF LOADING CART.
No. 528,424. Patented Oct. 30, 1894.
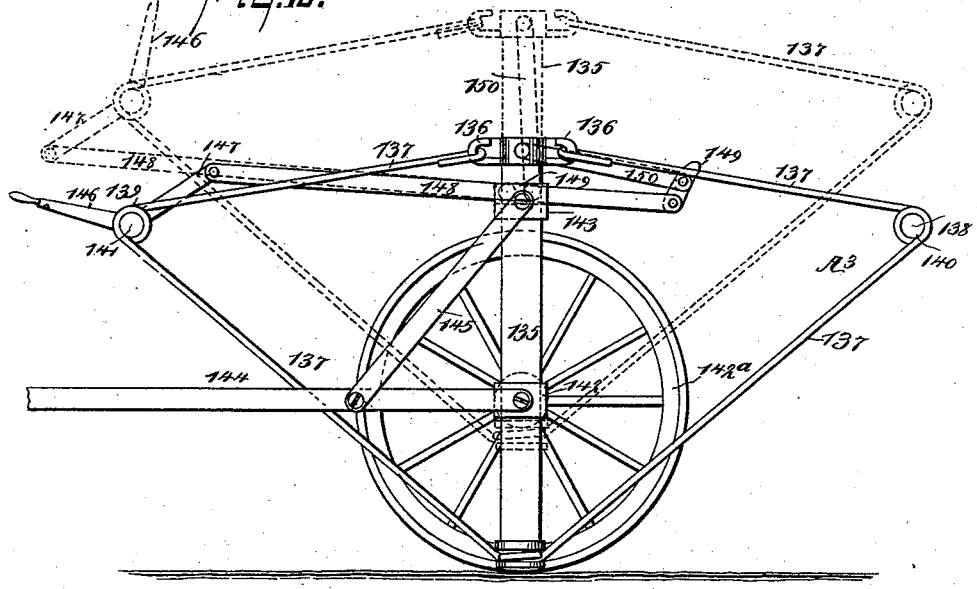
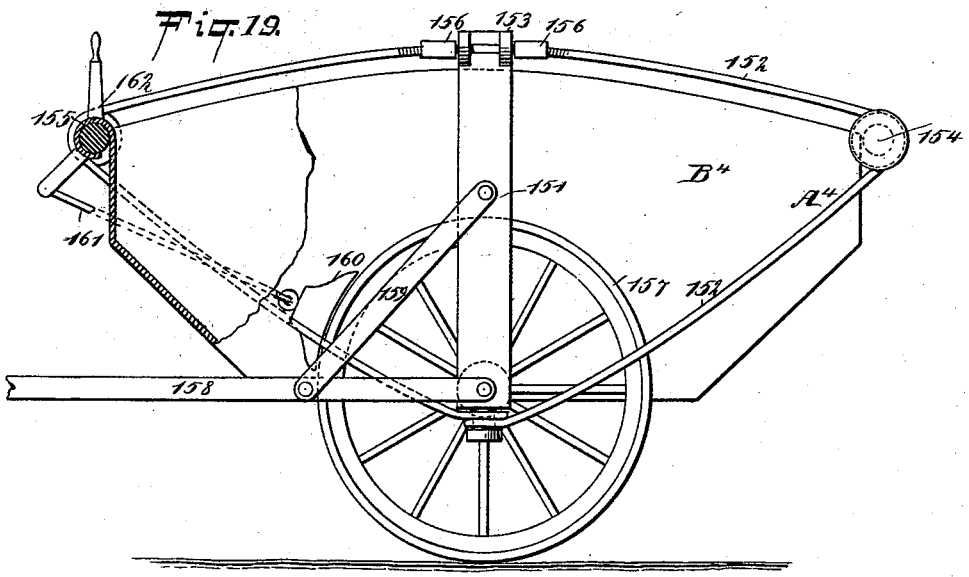
WITNESSES:
William Goebel.
E. M. Clark
INVENTOR
G. F. Fischer
BY Munn & Co
ATTORNEYS.

UNITED STATES PATENT OFFICE.

GEORGE FRANCIS FISCHER, OF ROCHESTER, NEW YORK.

SELF-LOADING CART.

SPECIFICATION forming part of Letters Patent No. 528,424, dated October 30, 1894.

Application filed September 14, 1893. Serial No. 485,458. (No model.)

*To all whom it may concern:*

Be it known that I, GEORGE FRANCIS FISCHER, of Rochester, in the county of Monroe and State of New York, have invented a new and useful Improvement in Vehicles, of which the following is a full, clear, and exact description.

My invention relates to an improvement in two-wheeled carts or vehicles.

The object of the invention is to provide an improved vehicle capable of effective service as a military transport cart, or in a rough or mountainous country where no local resources exist in the way of skilled labor or constructive material.

A further object of the invention is to construct the vehicle in such manner as to render it peculiarly adaptable to narrow and steep, rough and unbridged road-ways.

A further object of the invention is to construct a cart which may be expeditiously loaded upon what may be characterized as a self-dumping, self-loading, self-leveling and distributing plan, fulfilling the above requirements with coal or sand, dirt, gravel or other material of like nature.

Another feature of the invention is to so construct the vehicle that its contents may be quickly dumped either in a heap or distributed and leveled evenly over a given surface, and whereby the said dumping, loading, leveling and distributing may be accomplished by either the front or the back of the cart, and whereby further the frame and the body of the cart may be lowered to any position on the supporting wheels, or whereby the body may be lowered on the frame and independent of the frame, the front end of the cart in all respects being similar to the rear end.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 10:
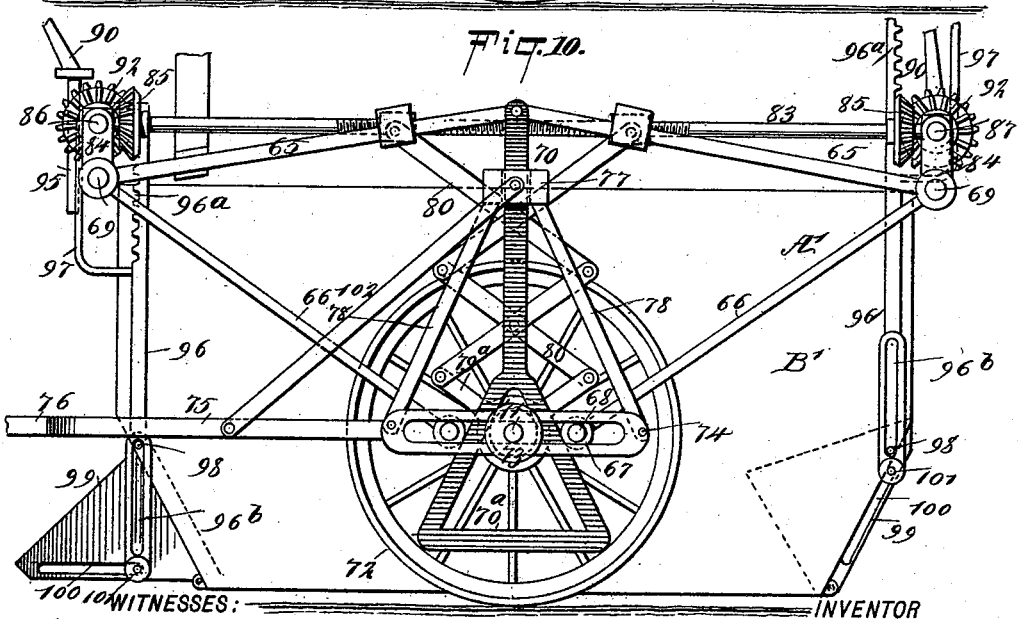

Figure 1 is a side elevation of the preferred form of vehicle, the vehicle being in its carrying position. Fig. 2 is a side elevation of the vehicle, the body thereof being in loading position. Fig. 3 is a plan view of the vehicle. Fig. 4 is an end view thereof. Fig. 5 is a section taken on line 5—5 of Fig. 7 through a pedestal and a portion of the frame, illustrating the body in side elevation and in dumping position. Fig. 6 is a detail sectional view, illustrating the operation of the forward dumping devices, and illustrating the forward inclination of the body when in dumping position at its forward end. Fig. 7 is a central vertical section through one of the supporting wheels, its box and pedestal, likewise a partial vertical section through a portion of the body, and Fig. 8 is a detail view of a mechanism for operating a drive shaft on the frame of the vehicle. Fig. 9 is a side elevation of a slightly modified form of vehicle, the body being in carrying position. Fig. 10 is also a side elevation of the modified form of vehicle, the body being in position for self-loading. Fig. 10$^a$ is a detail plan view of the adjusting means employed in this modification. Fig. 10$^b$ is a perspective view showing parts of the said adjusting mechanism. Fig. 11 is an end view of the modified form of vehicle, the draft mechanism being in section. Fig. 12 is a vertical section through a pedestal of the vehicle, the section being taken practically on the line 12—12 of Fig. 13. Fig. 13 is a partial side elevation of the pedestal, and the parts co-operating with it, a portion of the parts being shown in section and portions being broken away, and Fig. 14 is a detail view, illustrating the mechanism for operating the end gates in the position it occupies when an end gate is open. Fig. 15 is a side elevation of a further slightly modified form of the vehicle, the body being shown in positive lines in carrying position and in dotted lines in loading position. Fig. 16 is a section through a supporting wheel, its box and pedestal, and likewise a vertical section through a portion of the body of the vehicle, on the line 16—16 of Fig. 15. Fig. 17 is a sectional view similar to that shown in Fig. 16, illustrating however a shifted position of the pivot or fulcrum of the body of the vehicle; and Fig. 18 is a side elevation of a slightly modified form of frame for the vehicle, the upper position being shown in dotted lines and the lower position in positive lines; and Fig. 19 is a side elevation of a simplified form of the vehicle, adapted simply as a carrier, and in said figure a portion of the body of the vehicle is shown as broken away.

The preferred form of the vehicle is that which is illustrated in Figs. 1, 2, 3, 4, 5, 6, 7 and 8. All of the vehicles, however, are provided with truss frames, the body being supported by the frames, and the frames are supported through the medium of wheels, one located in each frame, the wheels having no connection, and in no instance does the axle extend through from one truss frame to the other.

The carrying frame in the preferred form of the machine or vehicle, comprises two truss frames A, constituting the sides of the carrying frame, and a connection between the truss frames at their ends. The truss frames are essentially of diamond shape, and each frame comprises an essentially inverted U-shaped pedestal 10, occupying a central position in the truss frame, and two parallel upper truss rods 11 and lower parallel truss rods 12. The upper truss rods are passed through apertures made horizontally in the upper portion of the pedestal, one at each side, while the lower truss rods are made to pass through apertures produced in the lower extremities of the members of the pedestals, and the extremities of both sets of truss rods are made to converge and are connected by front and rear truss blocks designated respectively as 13 and 14. These truss blocks are of somewhat angular construction, and the truss rods at their outer ends are threaded, being made to pass through corresponding apertures made in the upper and lower portions of the truss blocks; and the threaded portions of the truss rods are provided with lock and check nuts, designated respectively as 15 and 16, through the medium of which the truss rods and truss blocks are securely connected.

The pedestal has no movement upon the truss rods, and the lower truss rods are given preferably a much more decided upward inclination at each side of the pedestal than the downward inclination of the upper truss rods. The two opposing truss frames are united through the medium of connecting bars 17, which are made to enter and are secured in the central portion of transversely opposing truss blocks. The connecting rods 17 may be solid or tubular, preferably the latter.

It may here be remarked that in a simple form of the vehicle or cart, as the vehicle is properly a cart, the supporting wheels 18 may be journaled in the lower portions of the pedestals of the truss frames, and the body B of the cart will in that event be supported by and be secured to the front and rear connecting rods 17; but in the preferred form of cart, the body B is a dumping body, and is adapted to have various adjustments. Therefore, the supporting wheel 18 of each truss frame is located in the lower end of a box C. Shown best in Fig. 7. The box comprises two opposing plates 19 and 20, one being an inner and the other an outer one, the plates being held to slide in channels or slide-ways 21, produced in the inner faces of the pedestal members. The two plates are provided at their upper and lower ends with horizontal lugs 22, which extend beyond the front and rear surfaces of the pedestals, and the plates are connected at their upper ends by a pin 23, passed preferably through the forward lugs 22, and this pin has loosely mounted upon it a friction roller 24, and the plates are connected at their lower ends by a spindle 25, located centrally between its sides, and the said spindle is made to pass through the hub of the supporting wheel 18 belonging to the box, as illustrated in Fig. 7. The plates 19 and 20 of the boxes are provided with upper and lower guide plates 26, located at opposite sides of the pedestal 10, each guide plate 26 being connected by a pin 26ª, to the lug 22 of the adjacent box plate 19 or 20, with the exception of the forward upper ends of the boxes where the pins 23 carrying the friction rollers 24 serve also to connect the opposite guide plates and box plates. It will be observed that the pedestal is capable of vertical guided movement upon the boxes of the supporting wheels 18, and therefore the entire carrying frame and the body supported by the frame may be raised or lowered as occasion may demand.

The draft device consists preferably of a pole 27, having secured to it or having formed integral with its rear end a yoke 27ª, and the extremities of the yoke are carried one to an engagement with the outer lower guide strap of each box C, as shown in Figs. 1 and 2, being secured to said guide plate by pivot pins 28; and the upper and lower outer guide plates or straps 26, are connected by a link 29, each extending from the pivotal attachment of the yoke with the lower straps of the boxes to an engagement preferably with the central portion of the upper outer box strap 26; and in order that the pole may be placed properly, and in order that the draft may be applied equally to the upper and lower portions of the boxes, brace links 30, are connected with the upper outer box straps 26, by the same pivot pin 31 connecting with said straps the vertical links 29; and the lower ends of the brace links are secured to the members of the yoke 27ª a predetermined distance from their rear ends.

A brake shoe 32, is held to slide upon the forward section of the lower truss rods of each truss frame, to be manipulated in a manner to be hereinafter described.

The body B of the cart is adapted to be located between the truss frames A, and its sides are preferably straight and provided at each upper corner with a segmental rib 33, exteriorly located, the convexed surfaces of the ribs on each side facing the central portion of the body. The bottom of the body is of less length than the top, and the ends at the top are straight, the straight section of the ends extending down to a point at or near the lower outer ends of the ribs 33, and from that point the ends of the body are beveled or inclined downward and inward to meet the bottom. The upper straight portion of the ends of the body is made up of a fixed board or plate 34, and below the said fixed board or plate at the inclined portion of the ends, the body is open, and the openings are adapted to be normally closed through the medium of end gates 35. These end gates are in the nature of shovels, and may be properly so termed, since they comprise a body portion $b$, which is hinged to the ends of the bottom and is adapted to engage with the bottom of the fixed board or plate 34, when the end gate or shovel is in position to close the end opening in the body, and the outer or free end of the body may be beveled to any desired extent, or given substantially a thin or cutting edge if desired. At each end of the body of the shovel side pieces $b'$, are located, standing at a right angle to the body and secured to its inner face. The outer edges of the sides $b'$, are more or less inclined, as shown in Fig. 2, and when the end gates or shovels are in their closed position the sides will engage with the inner faces of the sides of the body proper, as shown in dotted lines in Figs. 1 and 5. When a load is to be dumped, or when a shovel is to be employed for the purpose of loading the body, the shovel or end gate is dropped to a horizontal position, as shown in Figs. 2 and 5, the shovel body being substantially in a plane with the bottom of the cart body. The end gates or shovels are supported in their open horizontal position, and locked in their upper closed position, through the medium of combined latch and supporting bars 36. These bars are of angular construction, comprising a long vertical member and a shorter horizontal member. The vertical member of each combined supporting and locking bar 36, is held to slide in a suitable aperture 37, made in the outer end portion of each segmental rib 33. Therefore, two of these bars are located at each side of the body, one at each end; and two of the bars are employed in connection with each end gate or shovel, one being located at each side of the gate.

The horizontal members of the combined locking and supporting bars 36 engage with the outer faces of the end gates or shovels; and intermediate of the ends of the vertical members of each of said rods an eye 38, or its equivalent, is formed, and the lower end of a spring bar 39, is secured to each eye 38; and when the end gates or shovels are closed the spring bars will be in their normal position, that is, in engagement with the convexed surfaces of the body ribs 33, the contour of which surfaces is closely followed, as illustrated in Fig. 1; and when the spring bars are in their normal position their upper ends extend above the upper edge of the body a predetermined distance, as is likewise shown in Fig. 1, said upper ends being formed with a horizontal extension or head $39^a$.

The means whereby the body is raised or lowered, the end gates manipulated and the brake applied is that illustrated in Figs. 1 to 6 and it is accomplished preferably through the medium of four racks designated respectively as $D$, $D'$, $D^2$ and $D^3$. These racks are duplicated at each side of the carrying frame, and three of them, $D$, $D'$ and $D^2$, are supported and are held to slide in recesses 40, made in the upper edges of the forward truss blocks; but other forms of guides or supports may be provided for the racks. These three racks are located side by side, each being capable of movement independently of the other, the teeth being placed upon their upper faces; and a shaft 41, is journaled in bearings 42, formed upon the said forward truss blocks, as shown in Fig. 4, the shaft being located preferably over and parallel with the forward connecting rod 17 of the frame. Two pinions 43, are held to slide upon the shaft 41, and are mounted to turn with the shaft, one pinion being located over each set of three racks so that the pinion of each set of racks may be carried to an engagement with any one of them. The shifting of the two pinions is simultaneously accomplished through the medium of a shifting lever 44, which is usually fulcrumed upon a standard 45, secured to the forward connecting bar 17, and this standard is bifurcated at its lower end and constitutes central bearings for the shaft 41. The lever 44, may be operated by foot or by hand, and shifting rods 46, are pivotally connected with the lever, one above and the other below its fulcrum, the outer extremities of the rods terminating in forks 47, as shown in Fig. 5, the forks being adapted to partially surround the shaft 41 and practically embrace the pinions. The shaft is rotated and likewise the pinions ordinarly through the medium of a hand lever 48, which lever is bifurcated at its lower end, and loosely mounted at its bifurcated portion upon the drive shaft 41, between the center bearings of the shaft, as shown in Fig. 4. The lever is provided with a thumb latch 49, which operates a dog 50, the dog being in engagement with a ratchet or toothed wheel 51, secured upon the shaft between the members of the driving lever; but it will be understood that any other form of driving mechanism for the drive shaft may be employed if in practice it is found desirable. The outer rack D of each set having sliding movement on the frame, is adapted to operate a brake shoe 32. To that end a link 52, is pivoted to each rack D near its outer end, as shown in Figs. 1 and 2, and a second and longer link 53, is pivoted at one end to the upper and shorter link 52, while the lower end of the longer link 53 is connected with the upper end of a brake rod 54, the lower end of the brake rod being connected with a brake shoe 32. The lower end of the longer link 53, is likewise pivoted to a lever 55, which is fulcrumed at or near its center upon an arm 56, projected rearwardly and preferably slightly downwardly from one of the forward truss blocks, the upper end of the lever being secured to the rear end of the rack.

In the operation of applying the brakes, the pinions are shifted over the brake racks D and the shaft rotated in a manner to force the racks outward or in a forward direction. The links 52 and 53 will then straighten themselves and the link 55 will be turned on its fulcrum sufficiently to force the brake shoes to a positive and firm engagement with the wheels. To remove the brakes the brake racks are carried in an inward direction and the brake shoes will be taken from engagement with the wheels. The racks D' are adapted for effecting vertical adjustment of the body; that is, for raising and lowering the body and the entire carrying frame. The racks D' are carried rearwardly through the pedestals above the upper ends of the wheel boxes.
The rear end of each rack D', is made quite wide, and the rear wide sections $d$ of these racks are provided with a forward lower inclined face $d'$, and a rear lower straight face $d^2$. The inclined plane or surface $d'$ of the racks is adapted to travel upon the friction rollers 24 of the wheel boxes, and the upper surface of the racks, which is straight, is adapted for engagement with the upper portion of the pedestals. Thus it is evident that when the adjusting racks D', through the medium of the pinions 43, are carried in a forwardly direction to their full extent, the extreme rear and wider portion of the racks will be located between the top of the wheel boxes and the upper portion of the pedestals, and therefore, the pedestals will be carried upward to their highest position, likewise the body and the entire frame, as shown in Fig. 1, the upper position of the body being its carrying position.

In order to lower the body to the position shown in Fig. 2, which may be termed its loading position, the adjusting racks are carried rearward, and as the inclined plane of the racks travels over the friction rollers of the boxes, presenting gradually to the pedestals and boxes reduced surfaces, the pedestals will travel downward upon the boxes, owing to the weight of the frame and body, and the frame and body will gradually drop to whatever lower position it is desirable that they should assume. The body and frame may be lowered to such an extent that the bottom of the body will be nearly in engagement with the surface over which the cart is traveling.

The racks $D^2$ and $D^3$, are dumping racks, and through the medium of said racks either the forward or the rear end gate or shovel may be manipulated, or either the forward or the rear end of the body may be dropped to a dumping position. The rack $D^2$ is the last of the set of three supported upon the frame, and it is adapted for the manipulation of what may be termed the forward end gate or shovel, and the forward end of the body. This rack, as is shown in Fig. 6, is provided at its rear end with an upwardly extending stud $56^a$, and the upper end of an arm 57, is pivotally connected with the upper portion of the stud $56^a$, said arm being fulcrumed upon one of the upper truss rods 11, as is shown in Figs. 1, 2 and 6. The arm 57, is carried downward and rearwardly, and is provided at its lower end with a lateral pin to receive a friction roller 58, and laterally of the arm one of the forward spring bars 39 is passed to an engagement with the friction roller.

When the body of the cart is in its upper or carrying position, the forward spring bars 39 hug closely and conform to the forward segmental ribs 33, and the friction rollers 58 of the forward dumping arms 57, bear against the spring bars upon their connection with the combined locking and supporting bars 36; but when the rack $D^2$, is carried outward, as shown in Fig. 6, the arm 57 is carried upward, and the forward end of the cart body is free to drop downward, and will drop until the friction rollers 58 of the dumping arms 57 engage with the heads $39^a$ of the said forward spring bars, whereby the front of the cart body is given a downward inclination, and the front end gate or shovel is free to drop to a horizontal position, since the combined supporting and locking bars 36 will be carried downward with the end gate or shovel by the weight of the load contained in the body, and the spring bar 39 will be flexed and substantially straightened. When the racks $D^2$, are carried rearward the arms 57 are restored to their normal position, that is, beneath the lower forward portion of the ribs 33, and in assuming this position the dumping arms will assist the spring bars to an engagement with the ribs, and as the weight of the body prevents the spring bars from slipping on the ribs 33, the lower ends of the spring bars will be compelled to move upward and thus elevate or close the end gate or shovel. During this upward movement the supporting bars 36 will slide in the apertures 37. When the friction rollers 58 move into proximity to the eyes 38, so that the portions of the spring bars against which the said rollers bear are no more in engagement with the ribs 33 (compare the left hand portion of Fig. 5), the spring bars will be fed upward on the said ribs, to bring them into the position shown in Fig. 1.

The shorter horizontal members of the combined locking and supporting bars 36 when in their upper positions, serve to hold the end gate or shovel closed, thus closing the forward end of the body; and the said members likewise serve as supports for the shovel or end gate when in its lower position. When the body is lowered to the ground, or practically so as shown in Fig. 2, and the forward end gate or shovel is lowered, as the cart travels over the ground it will automatically take up its load.

The fourth rack $D^3$ of each set, is preferably located at the inner side of the three lower racks and above the plane thereof, as shown in Fig. 4. The teeth of this rack are on the under side, and the rack is provided with a longitudinal slot 59, which receives a pin secured upon the stud $56^a$ of the inner one $D^2$ of the lower racks, as is likewise shown in Fig. 6. A bar 60, is pivotally connected with the inner end of each of the upper racks $D^3$, and the said bars are carried rearward over the top portion of the body, and at their rear ends each bar 60 is pivotally connected with a dumping arm 61, said arms being fulcrumed upon one of the upper truss rods 11; and the arms 61, are provided with friction rollers 62, which engage with the rear spring bars 39, and operate in connection with the said bars in the same manner as has been described with reference to the dumping arms of the front portion of the body.

It will thus be observed that either one of the end gates or shovels may be manipulated one independently of the other, and that the body may be dumped from either end, and while the wheels and their boxes do not change position with reference to the ground, the remaining portion of the structure may be adjusted vertically as desired. It is further obvious that the body is supported in the carrying frame by means of the dumping arms 57 and 61 only, and that the parts may be expeditiously and conveniently operated, while every portion of the cart is simple in its construction yet durable and exceedingly economic.

The upper racks $D^3$, receive their support from the lower inner racks $D^2$, by means of the pin on the stud or extension $56^a$ yet, as heretofore stated, one acts entirely independent of the other. When the back of the cart body is lowered, the forward dumping arms serve as fulcrums for the body, and the reverse is true when the front of the body is lowered and the back held in an elevated position. When the load is dumped from the back it is distributed over the surface of the ground.

The cart shown in Figs. 9, 10, 11, 12, 13 and 14, is a modified form of the cart heretofore described. The same principles however are involved, and the same dumping action and adjustment may be effected. The carrying or main frame of this cart is composed, as in the other cart, of two connected side truss frames A′, and each side truss frame consists of two parallel upper arched bars 65, the concaved surfaces facing downward; and at each extremity of each upper cross bar a lower truss bar 66 is pivotally connected, the lower truss bars inclining downward and in direction of a central line drawn vertically through the upper bars. The lower truss bars at the front and rear do not meet, a space being provided between them; and each lower truss bar at its lower end is provided with a friction roller 67, and each roller is provided with a pin 68, either attached to it or formed integral therewith, the pins of the outer rollers being upon their outer sides, while the pins of the inner rollers are upon their inner sides. The opposing upper truss bars of each truss frame, and likewise the two truss frames, are connected by front and rear bars 69, which may be tubular or solid; and the lower truss bars 66, are pivoted upon the said front and rear or end bars 69. Each truss frame is provided with two parallel pedestals 70. Each of these pedestals consists of a straight solid body section, and an open triangular foot section $70^a$, the upper ends of the body sections of the pedestals being permanently secured one to the outer upper truss bar and the other to the inner upper truss bar of each truss section, the attachment being made at the central portion of the said truss bars. The trunnions 71 of the supporting wheels 72, are passed through the space contained in the triangular foot sections of the pedestals, the pedestals being capable of movement to and from the trunnions, as shown in Fig. 12; and the trunnions at their extremities are provided with caps or heads 73. The trunnions 71, are likewise journaled in links 74, one link being made to extend transversely across the outer face of the foot section of the outer pedestal of a truss section, another link being correspondingly located upon the inner face of the inner pedestal of a truss section. Thus the two links are parallel, and the said links are detachably connected with a yoke 75, the body portion of which extends across one end of the cart, and to this yoke the draft pole 76, is secured. The rollers 67 on the lower truss rods of the truss sections, travel upon the outer inclined surfaces of the triangular foot sections of the pedestals, and are guided in their travel by their pins 68 entering the links 74 and moving therein. Guides for the pedestals are provided, said guides consisting of boxes 77, the body portion of each pedestal being loosely passed through one of the boxes, and the boxes are connected with opposite ends of the links 74 through the medium of brace bars 78. Between the hub of each wheel and each pedestal two collars 79, are loosely mounted upon the trunnions of the wheel, and each collar is provided with an arm $79^a$, located at its upper central portion, the arms on the same side of the wheel extending one in direction of the front and the other in direction of the rear; and the arms $79^a$ are pivotally connected with the lower members of lazy-tongs 80, the upper members of the lazy-tongs having virtually a pivotal connection with sockets 81, through which the upper truss rods of the truss sections loosely pass, and one of the sockets is located at each side of the center of each of the said upper truss rods, as shown in Figs. 9 and 10; and the opposing sockets of opposing lazy-tongs have two nuts 82 located between them, as shown in Figs. 10ᵃ, 10ᵇ, and 12, the nuts being connected with the sockets through the medium of pins 82ᵃ serving as pivots for the upper members of the lazy-tongs, and dove-tailed lugs 81ᵃ adapted to engage correspondingly shaped grooves in the sockets 81. Thus two nuts 82, are provided for each truss frame, and one of them is provided with a right-hand and the other with a left-hand interior thread. A line shaft 83, is made to pass through the nuts 82 of each truss frame, the shaft being provided with a right-hand and a left-hand thread corresponding to the threads in the nuts through which the shaft passes; and the ends of the shafts are journaled in bearings 84, which are preferably secured upon the front and rear connecting bars 69 of the main frame, as shown in Fig. 11. Each shaft 83 at each end has secured upon it a beveled gear 85, and at the front and at the rear of the main frame a drive shaft is located above the front and rear bars, the said shafts being designated respectively as 86 and 87. Each of these drive shafts is journaled at its ends in the bearings 84, and is further supported in central bearings 88, the bearings being secured upon the front and rear connecting bars, as shown also in Fig. 11; and the upper ends of the bearings are bifurcated to receive between their members ratchet wheels 89, one wheel being rigidly secured upon each drive shaft; and a driving lever 90, forked at its lower end, is located over each toothed or ratchet wheel 89, being loosely mounted one upon each drive shaft; and each driving lever is provided with a hand latch 91, carrying a dog to engage with the ratchet wheel over which the lever is located. Each drive shaft has loosely mounted upon it near each end a combination wheel 92, the said wheel combining a beveled gear and a pinion, the beveled gear being upon the outer face of the wheel; and it is adapted to mesh with an adjacent beveled gear 85 on the driven shaft 83. The combination wheels 92, have sliding movement on the drive shafts and turn with said shafts, and they are shifted through the medium of forks 93, which forks are connected with shifting rods 94, and said rods are pivotally connected with a foot or hand lever 95, one at each side of its fulcrum, the lever being pivoted preferably upon the bearings 88. The pinion section of each combination wheel is adapted to mesh with a rack surface 96ᵃ, formed upon the upper end of a dumping bar 96; and at the racked surface of each dumping bar a guard 97, is formed, through which the drive shafts pass, and the guards prevent the dumping bars from being lowered beyond a certain limit, as when the limit is reached the guards will rest upon the shafts, passing through them as shown in Fig. 14. Two of the dumping bars are located upon each side of the body A' of the cart, one at each end, and the lower end of each dumping bar is provided with a longitudinal slot 96ᵇ, receiving a guide pin 98, located upon the side of the body near its lower end portion. The body is of the same construction as that described in connection with the preferred form of cart, having beveled surfaces at the lower portion of each end and openings in the beveled surfaces adapted to be closed by end gates or shovels 99, which end gates or shovels are of like formation as those heretofore referred to; but in the sides of each shovel a slot 100 is made, parallel with the bottom and near the bottom, as shown best in Fig. 10, and the said slots in the shovels receive pins 101, projected from the inner sides of the lower ends of the dumping bars 96. The pole yoke 75, is supported and strengthened through the medium of brace bars 102, which are pivotally connected at their upper ends with the boxes 77 through which the pedestals slide, and at their lower ends are pivotally and detachably connected with the yoke; and in the form of cart heretofore described, as well as in the cart now under consideration, a driver's seat 103, is supported upon the main frame in any approved manner adjacent to one end, and if in practice it is found desirable in the present form of cart a seat may be located at each end. This cart may be made to travel either end forward, as may be desired, and it is raised and lowered by shifting the combination wheels 92 until the beveled surfaces are in engagement with the beveled wheels of the line or driven shafts 83; whereupon by manipulating the drive shaft upon which the combination wheels are located in one direction the upper ends of the lazy-tongs will be made to approach, and the lazy-tongs will be thereby lengthened and the entire frame will be carried downward, the standards sliding in their boxes 77, and the rollers on the lower truss rods will slide down the inclined planes on the foot of the standards, being guided by the links 74. In order to elevate the body and frame, the line or driven shafts 83 are made to revolve in a reverse direction, whereupon the upper ends of the lazy-tongs will be made to travel away from each other, the tongs will be shortened in length and the pedestals will be raised carrying with them the frame and body; and as the triangular foot sections of the pedestals are carried upward they will force the lower truss rods at the front and rear in opposite directions, and the said rods will thereby assist in the elevation. Either end of the body may be inclined downward and the end gate or shovel at that end brought to an open position by bringing the pinion section of the proper combination wheels in engagement with the rack surface of the dumping bars at that end of the body and manipulating the drive shaft at that end in a manner to carry the dumping bars downward to the position shown in Fig. 14, whereupon the shovel or end gate at that end will be opened and held in its open position. By reversing the movement of the drive shaft the shovel or end gate may be raised, closed and held in that position.

When the body of the cart is to be placed in position for self-loading, as shown in Fig. 10, the frame and body are carried to their lower position, and the front end gate or shovel is lowered.

In Figs. 15, 16 and 17, I have illustrated a further modification in the construction of my improved vehicle. The main or carrying frame is made up of opposing side truss frames $A^2$. These truss frames are constructed substantially in like manner as in the form of vehicle shown in Fig. 1, each frame comprising a pedestal 104, essentially inverted U-shape, the pedestals being provided with a slot 105 in each side, extending from a point near the top to a point near the bottom. Upper and lower parallel studs or truss bars or rods are employed, designated respectively as 106 and 107, the truss rods in connection with the pedestals being somewhat of a diamond shape. The upper truss rods are passed through apertures in the upper portion of the pedestals, and the lower truss rods are passed through the lower ends of the members of the pedestals. The extremities of the truss rods are threaded, and are passed through apertures located in truss blocks 108, the truss rods where they connect with the blocks being provided with lock and check nuts; and the opposing truss frames are connected by cross bars 109 passed through the center of the truss blocks. A box 110 is held to slide in each pedestal, as shown in Fig. 16; and in the lower portion of each box a supporting wheel 111 is mounted. Each box is provided with upper and lower guide straps 112 and 113, through which the pedestals have guided movement. The boxes and pedestals may be held rigidly in engagement when desired, through the medium of a set screw 114, which is passed through a plate engaging with the outer side of the pedestal, the said screw being made to enter the outer side of the box contained in the pedestal. Each pedestal is provided with lugs 115 at the top, the top being open, and the members of the pedestal are connected by a band 116, as shown in Fig. 16. In the said lugs a pinion 117, is journaled, adapted for engagement with a rack 118, the lower end of which has sliding connection with the box 110. By manipulating the pinions 117 in the truss frames the said pinions may be made to travel either up or down the racks 118, and consequently the pedestals and the frame of which they form a part will be correspondingly raised or lowered. The pinions 117, may be revolved in any suitable or approved manner. One form of operating device, however, is shown in Fig. 15, which consists of two levers 119 and 120, having a pivotal connection, and one of the levers is fulcrumed upon a stud 115 of one of the pedestals. It will be understood that each pedestal carries two levers, one lever being capable of being manipulated from the front of the vehicle and the other from the rear. Each lever is provided with a dog, which dogs are designated respectively as $119^a$ and $120^a$, and when a lever is reciprocated the dog connected with the lever will be brought into engagement with the pinion 117 near which it is located and the pinion will be revolved thereby. Brake shoes 121, as in the former styles of machine, are held to slide upon the lower truss rods in a manner to engage with the wheels 111, and the shoes are connected by brake rods 122 with angled levers 123, or their equivalents, fulcrumed upon one of the cross bars 109, the connection between the levers and brake rods being effected through the medium of links 124. The draft is accomplished through the medium of a pole 125, connected with a yoke 126 at its rear end, and the yoke is attached to the lower straps 113 of the boxes 110, and with the upper straps 112 through the medium of the connecting bars 127. The body $B^2$ of the vehicle is different in shape from the body portions heretofore described. The ends of the body are made to taper upward from their bottom to the top. Therefore, the bottom of the body is of much greater length than the top. In this form of body, the end gates are pivoted at a point between the top and bottom of the body and open upward, since if it is desired to effect a loading of the body while the vehicle is in motion, the bottom of the body at the end will act as a shovel, and the end gates, which are shown in dotted lines in Fig. 15, may be held elevated by any suitable device, and likewise any approved form of locking mechanism may be connected with it. The body $B^2$ in the present form of the vehicle is pivotally connected with the frame at or near the central portion of each side; and at the sides of the body, at the top and bottom, flanges 129 are formed, said flanges serving as bearings for screw shafts 130, as shown in Figs. 16 and 17, the upper ends of the shafts being adapted to receive cranks 131, whereby they are revolved. Each screw shaft carries a correspondingly interiorly threaded nut 132, and each nut is provided with trunnions 133, and normally the trunnions are made to enter and are capable of turning in bearings 134, formed in the racks 118. When it is desired to raise and lower the frame and the body together, it is accomplished by manipulating the levers 119 and 120 and moving the pedestals upward or downward upon the boxes 110; but if at any time it is desired to retain the frame in its elevated position, and lower the body independently of the frame, this may be accomplished by revolving the screw shafts 130, which will cause the body to be elevated or lowered according to the direction in which the shafts are turned. At such a time the boxes and pedestals are permanently connected through the medium of the set screws 114, and preferably the racks 118 are shifted out of engagement with the trunnions of the nuts 132 and the latter have their bearings upon the tops of the boxes, or upon the upper guides 112 of the boxes as shown in Fig. 17. It is evident that the body may be conveniently dumped, or placed in dumping position by reason of its pivotal connection with the frame.

In Fig. 18, I have shown a further modification of the vehicle, in which the body is omitted, as the body may be of any approved formation. Under this construction the frame consists of two connected truss frames $A^3$, and each truss frame comprises a pedestal 135, and truss bars shaped substantially in a diamond figure. The pedestals consist preferably of two pillars, connected at their upper ends by a cross bar, being unattached at their lower ends. At the upper end of each pillar of the pedestal hooks 136, or the equivalents thereof are formed at opposite sides, the hooks facing in direction of the front and rear of the frame; and a truss rod 137, is employed in connection with each pillar, each truss rod being in one piece. One end of a truss rod is secured to a rear hook 136, for example, and is carried downwardly and rearwardly, and is then bent upon itself to form an eye or coil 138; and from the eye or coil the rod is carried at an acute angle downwardly and forwardly, and is wrapped or coiled around the lower end of the pillar to which the hook 136 is attached. The rod is then carried upwardly and forwardly at an acute angle, bent upon itself to form a forward eye or coil 139, and it is then carried to an engagement with the opposite hook 136. The truss rods of each truss frame are parallel, and the two truss frames are connected by a cross bar 140, passed for example, through the rear eyes 136 of the truss rods, and a shaft 141 journaled in the forward eyes of the frame. A box of any approved construction is held to slide in each standard between the pillars thereof, the box being provided with an attached outer guide 142, through which the pillars have guided movement, and the said boxes are adapted to carry the trunnions of the supporting wheels $142^a$, and a second guide 143 is located above the box. The draft pole of the frame is provided with a yoke 144, which is secured to the guides 142 of the boxes, and is likewise connected with the upper guides 143 on the pedestals through the medium of a link or bar 145. The raising and lowering of the frame may be effected by the rotation of the shaft 141, which is provided with a hand crank 146 for that purpose; and a crank arm 147, is projected rearwardly from the shaft near each end, the crank arms being connected with the forward ends of links 148, which links have sliding movement in bearings upon the upper pedestal guides 143. Each of the long links 148, has a short link 149 pivoted to its rear end, and a third link 150, is made to connect each short link 149, with the cross bar or upper section of each pedestal. By causing the long links 148 to be drawn forward until the upper links 150 are in the vertical position shown in dotted lines in Fig. 18 the frame will be carried to its highest or carrying position and held in that position, since the short link and the lower end of the upper link 150, will rest upon and be supported by the upper pedestal guide 143. The frame is shown in its lowest position in positive lines.

A further modification is shown in Fig. 19. The carrying frame, as in the other forms, is constructed of two connected truss frames $A^4$. Each truss frame consists of an inverted U-shaped pedestal 151, and a pair of parallel truss rods 152, each of which is formed in one piece. The truss rods are passed through lugs 153, formed on opposite sides of the pedestals at the top. The rods are then coiled around the front and rear bars 154 and 155, which connect the two pedestal frames. The rods are secured to the lower ends of the pedestals by coiling them around reduced surfaces or studs on the lower ends of the pedestal members; and the threaded ends of the truss rods are then brought together, and connected through the medium of a coupling sleeve 156. The supporting wheels 157, are mounted in the pedestals, suitable bearings being provided for them; and the draft pole is provided with a yoke 158, which is connected with the outer side of the pedestals, and is braced by a bar 159. The brake shoes 160, are held to slide upon the truss bars forward of the pedestals, and are connected by links 161 with a lever 162, usually mounted upon the forward cross bar of the frame. The body $B^4$, may be of any desired shape, and is supported from the front and rear cross bars 154 and 155, being attached to them in any suitable manner. It will be observed that in each construction of vehicle described, no axle is employed, the wheels being simply provided with trunnions or spindles upon which they are mounted. Consequently the space between the wheels is unobstructed, and is utilized for the manipulation of the body of the vehicle.

All of the vehicles, with the exception of the one last described, which is simply for carrying purposes, are capable of having their body portions adjusted upward or downward, are further capable of dumping either at the front or at the rear, and of self-loading when required, and in one form of construction the body and frame are independently adjustable as well as combinedly so.

Having thus described my invention, I claim as new and desire to secure by Letters Patent—

1. In a vehicle, a frame and a body provided with gates at both ends, mechanism for raising and lowering the body in an essentially horizontal position, and means for opening and closing either of the end gates, substantially as described.

2. In a vehicle of the class described, a carrying frame consisting of two connected parallel double truss frames, supporting wheels located in each truss frame, between the sections thereof, and provided with independent axles, and a body carried between the truss frames, substantially as described.

3. In a vehicle of the class described, a carrying frame consisting of two connected truss frames, each truss frame being composed of an inverted U-shaped pedestal, a pair of upper truss rods engaging with the top part of the pedestal a pair of lower truss rods engaging with the bottom part thereof, supporting wheels located in each truss frame between the members of the pedestals and provided with independent axles, and a body carried between the truss frames, substantially as described.

4. In a vehicle of the character described, a frame adjustable upon its supporting wheels, and a body carried by the frame, vertically adjustable with and independent of the frame, as and for the purpose specified.

5. In a two-wheeled vehicle, a carrying frame consisting of two connected truss frames, each frame being composed of spaced upright plates connected at their upper ends and adapted to receive the wheels between them, and upper and lower truss rods engaging with the upper and lower parts respectively of the said upright plates, and extending therefrom on both sides, the outer ends of each upper truss rod being connected to the outer ends of the corresponding lower truss rod, substantially as described.

6. In a two-wheeled vehicle, a carrying frame, the same consisting of opposing and connected truss frames, boxes held to slide vertically in the central portion of each truss frame, supporting wheels journaled in the said boxes and having independent axles, and means for adjusting the truss frames in relation to the boxes and to the wheels, substantially as described.

7. In a two-wheeled vehicle, a carrying frame consisting of two connected truss frames, each truss frame being composed of spaced upright plates connected at their upper ends and adapted to receive the wheels between them, and upper and lower truss rods extending from the top and bottom respectively of the said upright plates and converging toward each other on each side of the said plates, the ends of each lower truss rod being connected to those of the corresponding upper truss rod, substantially as described.

8. In a two-wheeled vehicle, a carrying frame, the same consisting of opposing and connected truss frames, boxes held to slide vertically in the central portion of each truss frame, supporting wheels journaled in the said boxes and having independent axles, a wedge-shaped slide located between each box and the truss frame thereof and in engagement with the said box and truss frame, and means for moving the said slides relatively to the boxes and truss frames to adjust the frames in relation to the boxes and the wheels, substantially as described.

9. In a two-wheeled vehicle, a carrying frame the same consisting of opposing and connected truss frames, a supporting wheel located in each truss frame, their axles being independent, and means for adjusting the truss frames over the wheels, as and for the purpose set forth.

10. In a two-wheeled vehicle, a dumping body provided with end gates at opposite ends, means for raising and lowering the body without changing its inclination and adjusting devices whereby the body may be inclined in direction of either end, as and for the purpose set forth.

11. In a two-wheeled vehicle, a supporting frame, wheels independently connected with opposite sides of the frame, the frame being adjustable upon the wheels, a body carried by the frame between the wheels, provided with a scoop-like end gate at opposite ends, means for operating each end gate independently, and a mechanism substantially as shown and described, whereby the body may be raised and lowered independently of the frame, as and for the purpose set forth.

12. In a vehicle, a carrying frame consisting of connected truss frames, each truss frame being provided with a pedestal, a box held to slide in each pedestal, and a carrying wheel located in each box, as and for the purpose specified.

13. In a vehicle, a carrying frame, the same consisting of side truss frames, each truss consisting of side truss frames, each truss frame being provided with a central pedestal, and connecting bars uniting the side truss frames at the front and rear, boxes held to slide in the pedestals, a supporting wheel carried by each box, and adjusting devices whereby the frame may be raised or lowered upon the wheel supports, substantially as shown and described.

14. In a vehicle, the combination, with the body and its carrying frame, the boxes having guided movement relatively to the frame, and the wheels journaled in the said boxes, of bars having wedge-shaped portions engaging with the boxes and the corresponding carrying frames, and means, substantially as described, for imparting a longitudinal sliding movement to the said bars, as and for the purpose set forth.

15. In a vehicle, the combination, with the body, a double carrying frame having the body located between its members, and the wheels connected with the said frame, of suspension arms having pivotal connection with the frame and supporting engagement with opposite ends of the body, and means, substantially as described, for turning the said suspension arms on their pivots to shift the bearing of the said arms upon the body, as and for the purpose set forth.

16. In a vehicle, the combination, with the body, provided with gates at opposite ends, bars operatively connected with the gates and engaging with the body, a double carrying frame having the body located between its members, and the wheels connected with the said frame, of suspension arms having pivotal connection with the frame and supporting engagement with opposite ends of the body, and the corresponding gate-operating bars, and means, substantially as described, for turning the said suspension arms on their pivots to shift the bearing of the said arms upon the body and operate the end gates, as and for the purpose set forth.

17. In a vehicle, the combination, with a carrying frame comprising connected side truss structures, of a body supported within the said frame, wheel supports having sliding movement in the frame, wheels journaled in the supports end gates located at each end of the body, and adjusting devices having an operative engagement with each end of the body, and capable of independent action in raising the ends of the body, the adjusting devices likewise operating the end gates, substantially as shown and described.

18. In a vehicle, a carrying frame, a body located within the frame provided with end gates at opposite ends, wheel supports having sliding movement in the frame, adjusting devices, substantially as described, whereby the body and frame may be raised and lowered, suspension arms having pivotal connection with the frame and supporting engagement with the body at opposite ends, supporting devices connected with the end gates and operated from the suspension arms, and a shifting device whereby the bearing of a suspension arm upon the body is shifted, substantially as shown and described, and whereby either end of the body may be placed in dumping position, or elevated and the end gate opened or closed, as set forth.

19. In a vehicle, the combination, with a frame, of a body suspended within the frame near its ends by pivoted suspension arms, end gates located at each end of the body and controlled by the suspension arms, and shifting devices whereby the shifting at either end of the body may be independently effected, as and for the purpose specified.

20. In a vehicle, the combination, with a frame adjustable upon wheel supports, a dumping body carried by the frame and adjustable therewith, the body being provided at both ends with end gates of shovel-like construction, of an adjusting mechanism operating at each end of the body to raise or lower said ends independently of the frame, substantially as shown and described.

21. In a vehicle, the combination, with a frame adjustable upon wheel supports, of a dumping body carried by the frame and adjustable therewith, the body being provided at both ends with end gates of shovel-like construction, an adjusting mechanism operating at each end of the body to raise and lower said ends independently of the frame, and a draft mechanism having shifting connection with the wheel supports, whereby the vehicle may be made to travel in direction of either end, and load or dump at either end, as and for the purpose set forth.

22. In a vehicle, the combination, with a carrying frame consisting of connected truss frames, and a supporting wheel located in each truss frame, of a draft device connected with the wheel supports and with the frame above the wheel supports, whereby the equilibrium of the vehicle is preserved, substantially as shown and described.

23. In a wheeled and dumping vehicle, a body provided with an end gate at opposite ends, of a shovel-like character, dumping bars having an operative connection with the end gates, each dumping bar being further operatively connected with a rack, pinions engaging with the racks, and a mechanism, substantially as shown and described, for operating the pinions.

GEORGE FRANCIS FISCHER.

Witnesses:
LOUIS H. SCHLAGTER,
ELISABETH FISCHER.